United States Patent [19]
Dahm

[11] 3,798,537
[45] Mar. 19, 1974

[54] METHOD AND APPARATUS FOR MEASURING STRESSES IN FERROMAGNETIC MATERIAL

[75] Inventor: John R. Dahm, Pittsburgh, Pa.

[73] Assignee: Jones & Laughlin Steel Corporation, Pittsburgh, Pa.

[22] Filed: Dec. 10, 1969

[21] Appl. No.: 883,975

Related U.S. Application Data

[63] Continuation-in-part of Ser. No. 707,793, Feb. 23, 1968, abandoned.

[52] U.S. Cl. .................................................. 324/34
[51] Int. Cl. ............................................. G01r 33/00
[58] Field of Search .......................... 324/34 ST

[56] References Cited
UNITED STATES PATENTS
3,535,625  10/1970  Pratt................................ 324/34 ST

*Primary Examiner*—Alfred E. Smith
*Attorney, Agent, or Firm*—T. A. Zalenski; G. R. Harris

[57] ABSTRACT

Method and apparatus for measuring stresses in a ferromagnetic material are disclosed. A magnetic means is employed to establish magnetic flux flow paths in a ferromagnetic material in two directions at right angles to one another. Additional means is provided for determining the resultant flux flow developed by said paths whereby the magnitude of a stress applied to the material in one of said two directions is ascertained.

13 Claims, 11 Drawing Figures

PATENTED MAR 19 1974

INVENTOR
JOHN R. DAHM
BY *JA Zalenski*
ATTORNEY

INVENTOR
JOHN R. DAHM
BY
ATTORNEY

METHOD AND APPARATUS FOR MEASURING STRESSES IN FERROMAGNETIC MATERIAL

This application is a continuation-in-part of U.S. Pat. application Ser. No. 707,793, filed Feb. 23, 1968, and now abandoned.

This invention relates generally to method and apparatus for measuring mechanical stresses in ferromagnetic materials and more particularly to method and apparatus for measuring the tension forces in a moving strip of steel.

By means of the method and apparatus of the invention, the magnitude of a stress applied to a ferromagnetic material is determined. Magnetic flux flow paths are established in two directions at right angles to one another in the ferromagnetic material, one of said directions being the same as the direction of the applied stress. Portions of said paths pass through at least one common secondary electromagnet in opposite directions to one another to produce a resultant flux flow. The effects of temperature and variations in the thickness and natural permeability of the material on the flux densities developed are canceled so that for material which is magnetically isotropic, the resultant flux flow is a measure of the applied stress only. Where the material is magnetically anisotropic, means are provided to compensate for the anisotropism so that the resultant flux density is independent of that influence.

As is well know, the permeability of a ferromagnetic material varies with the stress applied thereto, and therefore the magnitude of the resultant flux flow so developed varies directly with the magnitude of the applied stress. The secondary voltage induced in the secondary electromagnets by the resultant flux flow is referred to a curve which defines the relationship between stress and induced voltage for material like the material under investigation, and the magnitude of the applied stress is thereby determined.

One way in which the present invention is employed is in determining the shape of ferromagnetic strip during the rolling thereof by determining the tensile stress distribution across the strip width in the rolling direction. Thus, an important factor in determining the quality of steel strip is its shape or flatness, i.e., the degree to which buckles or waves exist in the strip when it is allowed to lie free on a flat surface. When strip is rolled, as in a cold rolling operation, it often occurs that certain transverse por-tions of the strip are reduced and elongated in the longitudinal or rolling direction to a greater extent than other transverse portions. Often, the center of the strip is elongated to a lesser extent than the edges or vice-versa. This differential elongation between transverse portions of the strip causes waves or buckles to form in the strip, the extent to which they form being dependent upon the degree to which the various transverse portions of the strip are differentially elongated. Differential elongation of a strip results for various reasons. For example, the mechanical alignment and functioning of the mill may be defective, there may be an unbalance of roll forces, or there may be variations in the crowns of the rolls.

It is difficult to observe true strip shape during a cold rolling operation because the strip is under tension from the time it leaves the payoff reel to the time it is finally rewound on the recoil reel; and as a result, the strip is continually stretched and pulled flat so that its true shape is not discernible. It is not until the tension on the strip is released, as when the strip is unwound from the winding reel without the application of tension, that the strip shape becomes visually evident. By this time it is too late to take any corrective action at the mill.

It is possible, however, to determine strip shape indirectly during the passage of the strip through the rolling mill by measuring the variations in the tension forces in the rolling direction established in the strip across its width as a result of the stretching of the strip between adjacent rolling stands, between the recoil reel and the final stand, or between the payoff reel and the initial stand.

Such variations in tension forces result from the differentially elongated transverse portions of the strip being differentially stretched as the strip is pulled flat during rolling. The tension in any portion of the strip is directly related to the extent to which it is stretched and the extent to which it is stretched is inversely related to the extent to which it has been elongated. The tension profile of the strip across its width therefore reflects the shape of the strip.

By employing the method and apparatus of the present invention, the tension profile of a steel strip is determined and strip flatness thereby ascertained during the rolling of the strip. When the strip is determined to possess poor shape, immediate corrective action can be taken.

An object of the invention is to provide method and apparatus for measuring stresses in a ferromagnetic material. Another object of the invention is to provide method and apparatus for measuring the magnitude of stresses applied to a ferromagnetic steel sheet or strip. A further object of the invention is to provide method and apparatus for measuring the magnitude of stresses applied to a moving strip of ferromagnetic material without physically contacting the strip. Another object of the invention is to provide method and apparatus for measuring the tension applied to a ferromagnetic material during the rolling thereof without physically contacting said material. Another object of the invention is to provide method and apparatus for making such measurements where the material is magnetically anisotropic. A further object of the invention is to provide method and apparatus for making such measurements where the spatial relationship between said apparatus and material changes during the course of the measurement. Yet another object of the invention is to provide method and apparatus for measuring the tension applied to a ferromagnetic steel strip during the cold rolling thereof whereby the shape of the strip is determined.

These and other objects and advantages of the present invention will be apparent from the following description thereof with reference to the accompanying drawings in which.

Figure 7:
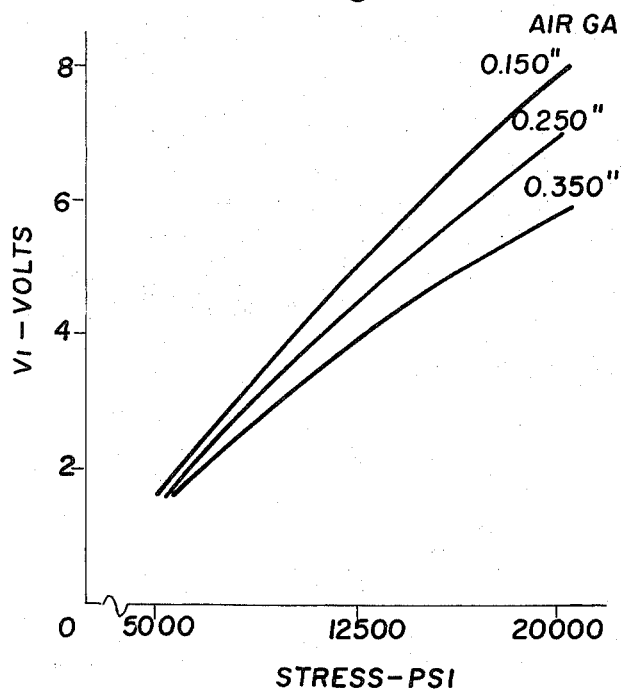
Figure 8:
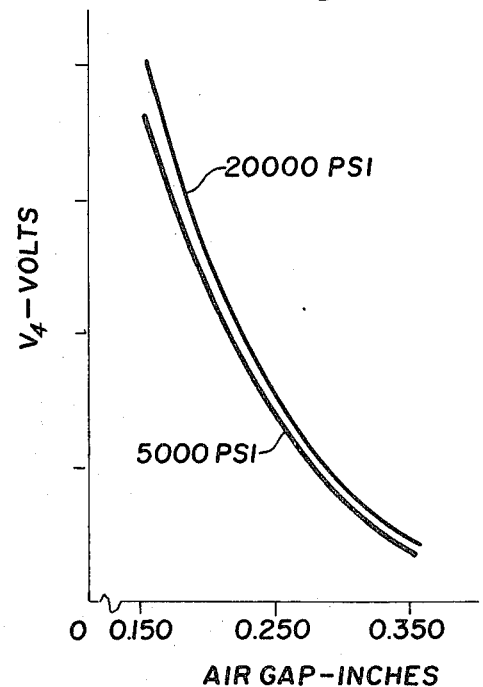
Figure 9:
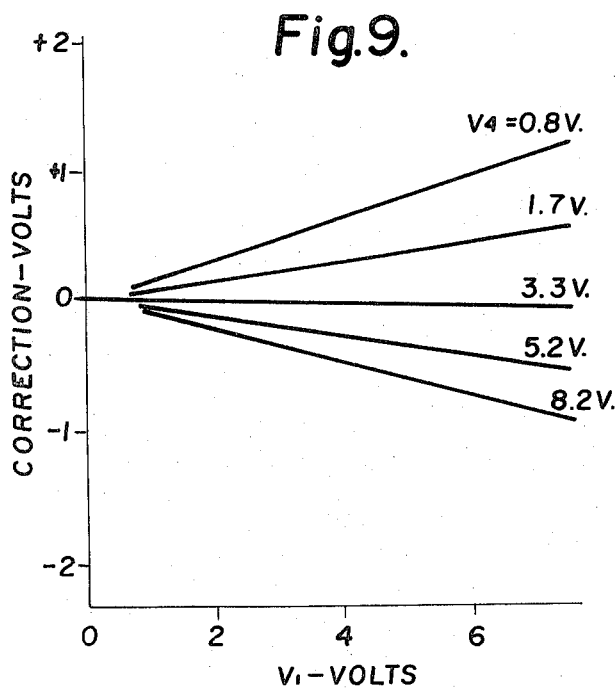

FIGS. 7, 8, and 9 are a series of curves which relate stress in a strip to the air gap between the strip and a stress sensing device.

As noted, one use of the present invention is in determining steel strip shape during the cold rolling thereof by measuring the variation in tension across the width of the strip as it leaves the final stand and is wound on a recoil reel, and the invention is described herein with reference to such use. It is to be understood, however, that the invention is not limited to such use but is employed generally where a determination of stress in a ferromagnetic material is desired.

Figure 1:
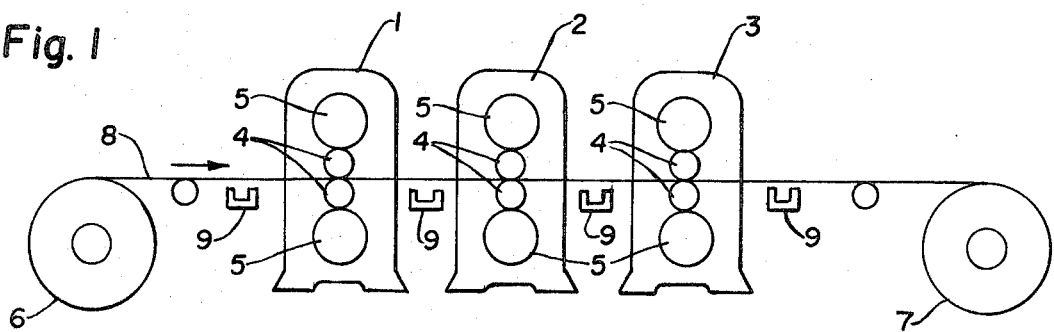
FIG. 1 is a diagrammatic side elevational illustration of a three-stand tandem cold reducing mill of ordinary construction wherein the present invention is employed.

A cold-reduction mill of ordinary construction, including stands 1, 2 and 3, each having a pair of driven work rolls 4—4 and backup rolls 5—5, is shown in FIG. 1. At the entry side of stand 1 is a payoff reel 6 and on the delivery side of stand 3 is a tension recoil reel 7. Each pair of work rolls acts to drive the strip 8 at speeds so synchronized that the strip is under tension at each of the stages between the payoff reel, the sets of work rolls and the recoil reel. Stress sensing devices 9—9 constructed according to the present invention are positioned beneath the strip 8 at any one or more of the stages for measuring the tension in the strip in the manner described below.

Figure 2:
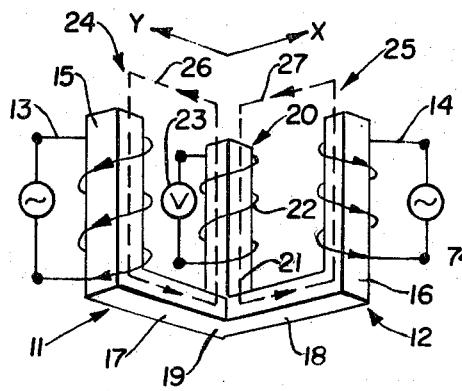
FIG. 2 is a perspective view of a stress sensing device according to one embodiment of the invention.
Figure 2A:
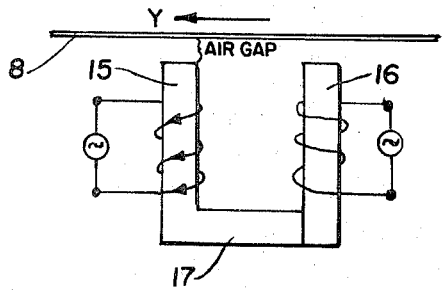
FIG. 2A is a side elevational view of the device of FIG. 2 shown in operative position beneath a moving ferromagnetic steel strip.

A first embodiment of a stress or tension sensing device according to the present invention is shown in FIGS. 2 and 2A. The device is shown in position beneath a strip 8 in FIG. 2A. It consists of first and second primary electromagnets 11 and 12 having soft iron or laminated cores and primary windings 13 and 14, respectively. The cores of the primary electromagnets are alike in size and shape and include both upstanding or vertical legs 15 and 16 and horizontal legs 17 and 18. The horizontal legs of the cores are joined at a right angle at one of their ends at 19 and are at this common location joined at right angles to the core or vertical leg 21 of secondary electromagnet 20. Leg 17 is joined at its other end to leg 15 and leg 18 is joined at its other end to leg 16. Vertical leg 21 is parallel to vertical legs 15 and 16 so that a vertical plane entirely containing electromagnet 11 and leg 21 intersects a vertical plane entirely containing electromagnet 12 and leg 21 at right angles along leg 21. Secondary winding 22 is connected to a voltmeter 23 for displaying the voltage induced in the secondary electromagnet by the primary electromagnets. Windings 13 and 14 are connected to a source of alternating electric power in a manner so that the current flow through each produces countercurrent magnetic flux flow paths along their respective cores and along the secondary electromagnet. Thus, in FIG. 2 the current is caused to flow in windings 13 and 14 in the direction shown by the arrows thereon thereby producing magnetic flux flow paths 24 and 25, respectively, flowing in the directions shown.

When in use for measuring tension in a ferromagnetic material in a given direction, such as strip 8 along the rolling direction, the sensing device is positioned below and out of contact with the strip so that the plane containing the faces of the legs 15, 16 and 21 is separated from the strip by an air gap as best seen in FIG. 2A. The device is further located so that a vertical plane through electromagnets 11 and 20 is aligned in the direction of rolling, indicated as direction Y in FIGS. 2 and 2A. A vertical plane through electromagnets 12 and 20 is thereby aligned in a direction transverse to the rolling direction, indicated as direction X in FIG. 2.

Initially a set of magnetic flux flow paths comprising first and second paths are established by the device. The current produced in winding 13 establishes a first magnetic flux flow path 24 in the direction shown. The path is aligned by the positioning of the sensing device so that a first portion 26 of the path passes through the strip in the rolling direction Y which is also the direction of movement of the strip. A second portion of the flux flow path passes in a first direction upwardly along magnetic core 21 and other portions of the path pass through legs 15 and 17 of electromagnet 11 in a corresponding direction.

The current produced in winding 14 establishes a second magnetic flux flow path 25 in the direction shown by appropriate connection with the source of alternating electrical power as noted above. Path 25 is aligned by the positioning of the sensing device so that a first portion 27 thereof passes through the strip transverse to the rolling direction and the direction of movement of the strip. A second portion of flux flow path 25 passes downwardly along magnetic core 21 in a direction opposite to that of the portion of path 24 common thereto. The other portions of path 25 pass through legs 16 and 18 of electromagnet 12 in a corresponding direction. The portions of the flux flow paths 24 and 25 passing through core 21 in opposite directions produce a resultant magnetic flux density therein equal to the difference between the flux densities of those portions. The resultant flux density causes an electrical quantity in the form of a voltage to be induced in secondary winding 22. The voltage induced varies with the magnitude of the resultant flux and thus provides a measure of that flux. This voltage is indicated by voltmeter 23.

Where the strip is magnetically isotropic, the density of a flux path depends an strip thickness, temperature, natural permeability and the applied tension. The effects of variations in thickness, temperature and natural permeability are significant compared to the effects of the applied tension so that if only a single flux path, established in the direction of applied stress, were used, variations in applied stress would result in only small variations in a large signal. By employing two opposing flux paths, one in the direction of the applied stress and the other at right angles thereto, the constant part of the signal which is due to the influence of strip thickness, temperature and natural permeability is nulled and by amplifying the resultant signal produced at the secondary electromagnet 20, a more sensitive measure of the applied tension is obtained. In addition, by negating the primary effects of strip thickness, temperature and natural permeability on the flux densities, no consideration need be given to the manner in which these properties vary through the length of a coil.

It can now be understood that when the strip is magnetically isotropic, the resultant flux density in electromagnet 20 reflects the magnitude of the applied tension in the strip. By referring the output of voltmeter 23 to a calibration curve prepared for a ferromagnetic material having the same characteristics as the strip, the actual applied tension is determined.

Where the strip is magnetically anisotropic and displays a higher magnetic permeability in one direction than in another because of stresses established in the strip during the processing thereof by cold rolling or the like, means for compensating for the anisotropism are provided as is more fully explained below.

To obtain a profile of the tension variation across the width of the strip, a plurality of the sensing devices described are positioned beneath the strip across its width so as to establish a plurality of sets of magnetic flux flow paths. The variation in tension across the strip can then be used to determine strip flatness. If, for example, the measured tension is uniform along the strip edges but greater at the center, this would suggest that the edges of the strip are being elongated to a greater extent than the center and that the strip is not being rolled flat. Appropriate corrective action can then be immediately taken.

Figure 3:
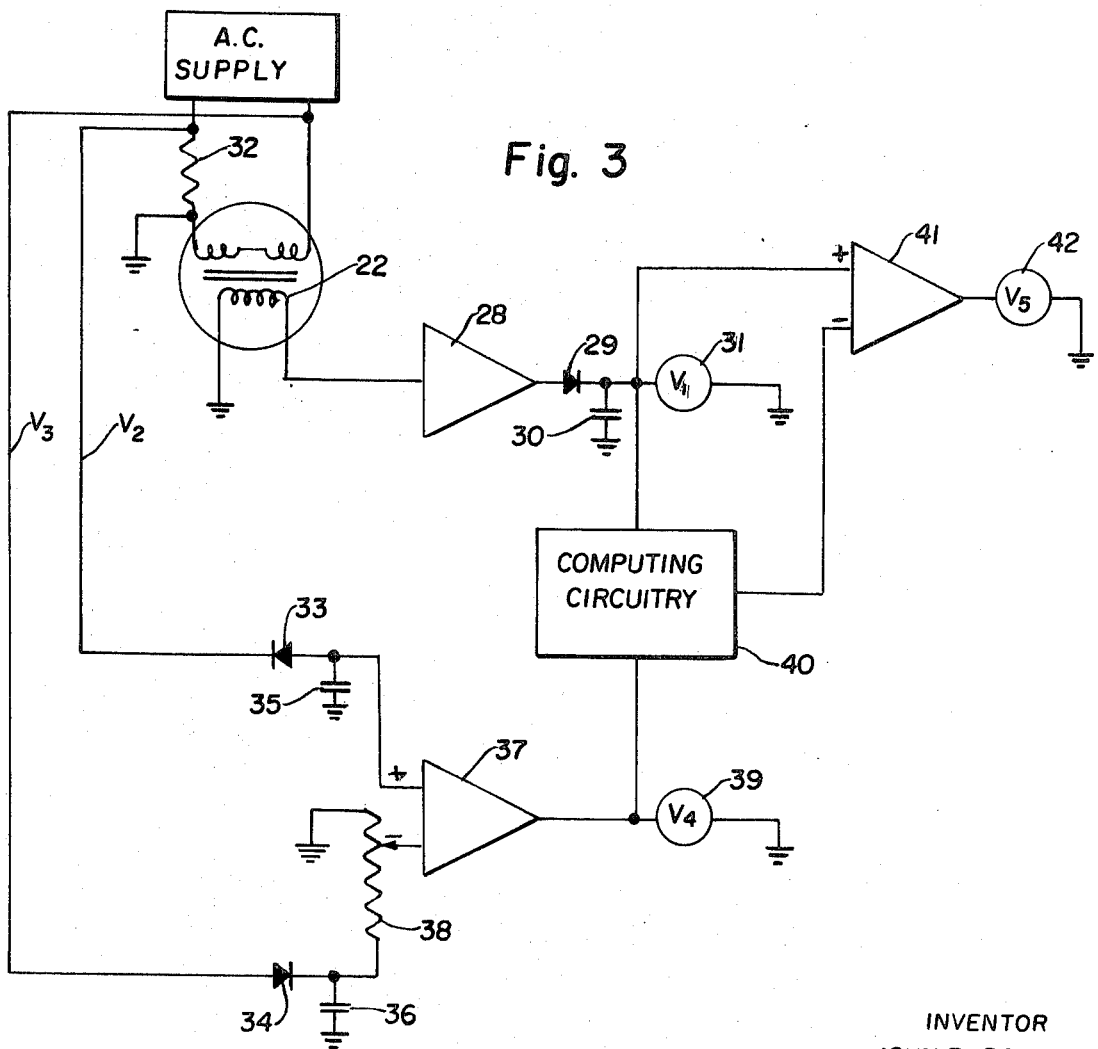
FIG. 3 is a schematic circuit diagram of an electrical circuit used in conjunction with the sensing device of the invention.

Oftentimes, the strip as it passes over the tension sensing device does not maintain a constant spatial relation with the device so that the air gap between the plane of the strip and the plane containing the electromagnet faces continually changes. Because the sensing device is basically an iron core inductor with an air gap, its impedance is dependent on the size of the air gap between the strip and electromagnet faces as well as the permeability of the strip. Since impedance is directly proportional to voltage and inversely proportional to current, the voltage across the sensing device and the current through it are a measure of the impedance and hence a measure of the combined effects of air gap size and stress in the strip. Therefore, as the size of the air gap varies the voltage induced in winding 22 also varies so that the voltage does not accurately reflect strip tension. FIG. 3 illustrates apparatus which is used in correcting for such variations in air gap size.

The secondary voltage induced in winding 22 is amplified in amplifier 28 rectified and filtered by diode 29 and capacitor 30 and displayed on voltmeter 31 as DC voltage $V_1$. Voltage $V_1$ comprises a first electrical signal which is a measure of both the stress in the ferromagnetic material being measured and the size of the air gap between the material and the electromagnetic device. Means will now be described which adjusts $V_1$ to provide an adjusted electrical signal, $V_5$, which is a measure of the stress and is independent of the size of the air gap.

A current-sensing resistor 32 is connected in series with the AC power supply and a voltage $V_2$ developed thereacross. When the supply is a constant current source $V_2$ is constant. The voltage $V_3$ across the sensing device will, however, be a measure of the combined effect of air gap size and stress in the strip. Since it is desirable to measure the small variations in $V_3$ caused by these combined effects, the constant part of $V_3$ is subtracted out. This is done by using constant voltage $V_2$ as a bucking voltage. $V_2$ and $V_3$ are first rectified by diodes 33 and 34, respectively, filtered by capacitors 35 and 36, respectively, and bucked in amplifier 37 to produce a voltage $V_4$, displayed on voltmeter 39. A voltage divider 38 is employed to appropriately match the amplitudes of the rectified voltages $V_2$ and $V_3$.

$V_4$ is proportional to air gap size and stress as is $V_1$, and, therefore, these two voltages being a function of the same two variables are com-bined in an appropriate computing circuitry 40 to solve for a correction which when algebraically added to $V_1$ yields a measure of tension which is independent of the size of the air gap. The addition is carried out in amplifier 41 and displayed as voltage $V_5$ on voltmeter 42. This corrective feature of the present invention can be more fully understood by referring to FIGS. 7, 8 and 9 of the drawings.

FIG. 7 is a series of curves which relate $V_1$ to the stress in cold rolled, low carbon steel strip for air gaps of 0.150 inch, 0.250 inch and 0.350 inch. FIG. 8 graphically illustrates the relationship between $V_4$ and air gap size for cold rolled, low carbon steel strip containing stresses of 5,000 and 20,000 psi. As can be seen, $V_4$ varies only slightly with variations in stress. The curves of FIGS. 7 and 8 are derived experimentally by applying known stresses to a sample of steel of the type being considered while measuring $V_1$ and $V_4$ with a voltmeter. This is done for various air gap sizes.

For practical purposes, $V_4$ can be considered as independent of stress. Adopting this assumption, for a system where the air gap is set at 0.250 inch, the relationships illustrated in FIG. 9 are derived from the curves of FIGS. 7 and 8. Thus, based on the values of $V_1$ and $V_4$ a correction is provided which when algebraically summed with $V_1$ results in a corrected $V_1$ or $V_5$ which is representative of the stress in the strip. As illustrative of the above, consider the following example: The electromagnetic device is set 0.250 inch below the strip. At a particular instant during the passage of the strip over the device, $V_1$ reads 4 volts and $V_4$ reads 5.2 volts. Referring to FIG. 9, it can be seen that for those values, the correction is −0.3 volts. Therefore, the corrected voltage, $V_5$, is 3.7 volts. Because FIG. 9 is based on an air gap size of 0.250 inch as being the working air gap, reference is had to the 0.250 inch air gap curve of FIG. 7 where a voltage of 3.7 volts is representative of a stress of 10,500 psi. The same result is attained from a consideration of FIGS. 7 and 8, without the benefit of FIG. 9. Thus, from FIG. 8, when $V_4$ is 5.2 volts, the air gap is 0.20 inch; and from FIG. 7, when the air gap is 0.20 inch and $V_1$ is 4 volts, the stress is 10,500 psi.

This corrective action is incorporated into the present invention, for example, by providing an analog function generator as the computing circuitry 40. The function generator is programmed in accordance with FIG. 9 so that its output provides the correction voltage based on the $V_1$ and $V_4$ inputs. Such function generators and their method of operation are well known in the art. It is also possible to use presently available general purpose digital computers for computing circuitry 40. A computer can be programmed according to known techniques to solve for the simultaneous equations embodied in the curves of FIGS. 7 and 8. Alternatively, the computer can be programmed according to curves of FIG. 9 to provide an output which upon being converted by a digital to analog converter is applied to amplifier 41 as the correction voltage. It will be understood that where the working air gap size is set to be other than 0.250 inch, a different set of curves, like those of FIG. 9, is derived from FIGS. 7 and 8, using the other working air gap size as the reference base.

If the power supply is a constant voltage source, $V_2$ is a measure of air gap size and stress and $V_3$ is used as the bucking voltage. The use of $V_2$ as the bucking voltage to obtain $V_4$ is preferred, however. Since $V_2$ is a measure of sensor current, a small change in current causes a corresponding change in $V_2$ which cancels any changes in $V_3$ due to the current changes. $V_4$ is then independent of small current changes in the sensor supply.

As a modification of the apparatus of FIG. 3 either voltage $V_2$ or $V_3$, depending on whether a constant current or constant voltage power supply is employed, after being rectified, is filtered and fed directly to computing circuitry 40 without first subtracting out the constant portion thereof. Since the changes in voltage that occur as a result of changing air gap size are small, however, it is preferred to place $V_2$ and $V_3$ in bucking relationship so as to subtract out the constant portion of the voltages thereby giving a more accurate indication of the changes which occur.

Figure 4:
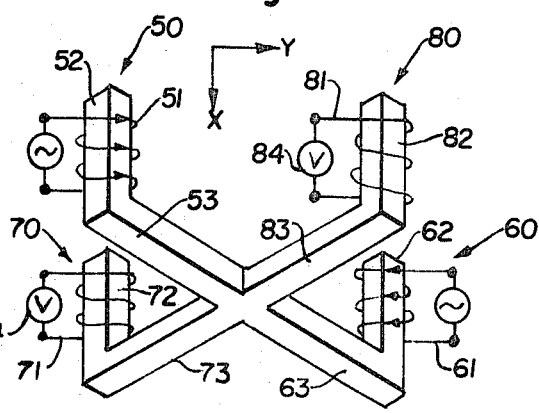
FIG. 4 is a perspective view of a stress sensing device according to a second embodiment of the invention.
Figure 4A:
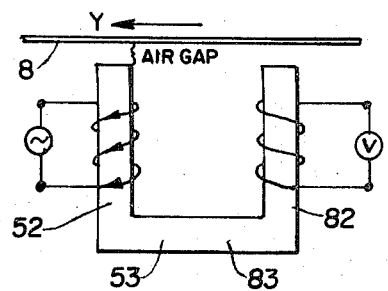
FIG. 4A is a side elevational view of the device of FIG. 4 shown in operative position beneath a moving ferromagnetic steel strip.

In employing the three-legged sensing device described, it is necessary to maintain the plane of the strip exactly parallel to the plane containing the electromagnet faces. If the sensing device is tilted slightly with respect to the strip, the sizes of the air gaps between each of the electromagnet faces and the strip will be different; and consequently the densities of the flux flow paths established will not accurately reflect the stresses present in the strip since the densities of the paths will be affected differently by the different air gap sizes. An embodiment of the invention by means of which accurate tension measurements can be made when the two planes are not parallel is shown in FIGS. 4 and 4A. In this embodiment two primary and two secondary electromagnets are provided so that each primary electromagnet divides its flux between the two secondary electromagnets. The two secondary voltages are then added so as to compensate for tilting of the sensing device with relationship to the strip.

The four-legged tension sensing device comprises first and second primary electromagnets 50 and 60 having soft iron or laminated cores and primary windings 51 and 61, respectively. The cores of the primary electromagnets are alike in size and shape and include both upstanding or vertical legs 52 and 62, respectively, and horizontal legs 53 and 63, respectively. The device also includes first and second secondary electromagnets 70 and 80 having soft iron or laminated cores and secondary windings 71 and 81, respectively. The cores of the secondary electromagnets are also alike in size and shape and include both upstanding or vertical legs 72 and 82, respectively, and horizontal legs 73 and 83, respectively. The primary electromagnets lie in a first plane and the secondary electromagnets lie in a second plane which intersects the first plane at a right angle. All the horizontal legs are of equal length so that each of the upstanding legs of the secondary electromagnets are equidistant from each of the upstanding legs of the primary electromagnets and the distance between the secondary electromagnets is the same as the distance between primary electromagnets. The four horizontal legs are joined together at one of their ends and to a respective one of the vertical legs at their other ends.

Windings 51 and 61 are connected to a source of alternate electric power in a manner so that the current flow therethrough is in the direction shown. As a result a set of magnetic flux flow paths comprising first and second pairs of paths are established, each of the primary electromagnets generating one pair of paths. The sensing device is positioned so that one of the paths generated by primary electromagnet 50 includes a first portion passing through strip 8 in the rolling direction Y. The remainder of the path passes down leg 82, inwardly along leg 83, outwardly along leg 53, upwardly through vertical leg 52, across the air gap separating the sensor from the strip passing overhead and into the strip. The other magnetic flux flow path generated by electromagnet 50 passes upwardly through vertical leg 51, across the air gap into and through the strip in the direction X transverse to the rolling direction Y, down leg 72, inwardly along leg 73 and then outwardly along leg 53.

Correspondingly, one of the paths generated by primary electromagnet 60 includes a first portion passing through the strip 8 in the rolling direction Y. The remainder of the path passes downwardly through leg 62, inwardly through leg 63, outwardly through leg 73, upwardly through leg 72 and then across the air gap and into the strip. The other magnetic flux flow path generated by electromagnet 60 passes downwardly along leg 62, inwardly along leg 63, outwardly along leg 83, upwardly along leg 82, across the air gap, through the strip in the direction X transverse to rolling direction Y, across the air gap back to leg 62.

The two paths generated by electromagnet 50 pass upwardly of leg 52, a first portion of one path passing through the strip in the rolling direction and a second portion passing through electromagnet 80 downwardly in a first direction; a first portion of the other path passes through the strip in the direction transverse to the rolling direction and a second portion passes through electromagnet 70 downwardly in a first direction. The two paths generated by electromagnet 60 pass downwardly of leg 62, a first portion of one path passing through the strip in the rolling direction and a second portion passing through electromagnet 70 upwardly in a second direction opposite to said first direction; a first portion of the other path passes through the strip in the direction transverse to the rolling direction and a second portion passes through electromagnet 80 upwardly in a second direction opposite to said first direction. The portions of the paths common to legs 72 and 82 produce first and second resultant flux densities, respectively, therein. These resultant flux densities cause voltages to be induced in secondary windings 71 and 81, respectively, which voltages are indicated by voltmeters 74 and 84, respectively. By adding the two secondary voltages induced in windings 71 and 81 an indication of the tension in the strip is obtained which is independent of the parallelism between the plane of the electromagnet faces and the plane of the strip. The sensor of FIG. 4 can, of course, be used in conjunction with the apparatus of FIG. 3 to compensate for changes in the size of the air gap as the strip passes over the sensor.

As briefly mentioned above, often, the strip after cold rolling is magnetically anisotropic and displays a higher magnetic permeability in the transverse direction than in the rolling direction. Consequently, when the present invention is employed on such strip, a resultant secondary voltage will be generated in the secondary winding in the absence of any applied stress and as stress is applied and increased the voltage decreases to zero and then increases with opposite phase. Such signals are difficult to interpret. This effect is overcome by providing the sensor with a primary bias winding as shown in the modified sensor of FIG. 5.

Figure 5:
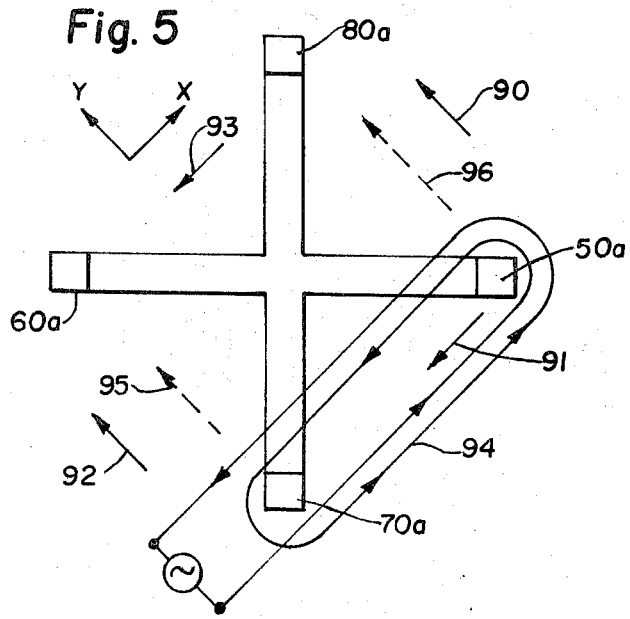
FIG. 5 is a top plan view of a modification of the device of FIG. 4 wherein means is provided for compensating for strip magnetic anisotropy.

A top plan view of a sensor having the same general construction as the sensor of FIG. 4 is shown in FIG. 5. In use, the sensor is positioned beneath the strip so that a first magnetic flux flow path generated by primary electromagnet 50a has a portion which passes through the strip in the direction of arrow 90 and a second path generated by that electromagnet has a portion which passes through the strip in the direction of arrow 91. At the same time primary electromagnet 60a generates a first magnetic flux flow path which has a portion passing through the strip in the direction of arrow 92 and a second path which has a portion passing through the strip in the direction of arrow 93. The directions indicated by arrows 90 and 92 are parallel to the Y or rolling direction of the strip while the directions indicated by arrows 91 and 93 are transverse thereto. A primary bias winding 94 is provided about primary electromagnet 50a and secondary electromagnet 70a and current is caused to flow therein in the direction shown. The bias winding establishes additional magnetic flux components in the strip in the direction of arrows 95 and 96. This additional flux is used to supplement the flux in the strip in the rolling direction over that provided by the two primary electromagnets without affecting the flux density in the transverse direction and thus compensates for strip anisotropy. By adjusting either the current level of the primary bias power supply or the number of turns in the bias winding, the resultant secondary output can be made zero when no stress is applied.

Figure 6:
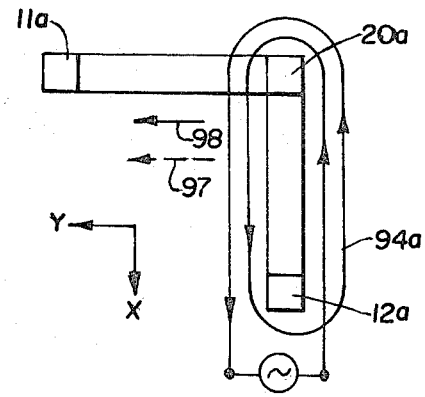
FIG. 6 is a top plan view of a modification of the device of FIG. 2 wherein means is provided for compensating for strip magnetic anisotropy.

A primary bias winding is also employed in conjunction with a three-legged sensor to correct for anisotropy of the strip. FIG. 6 illustrates a top plane view of such an arrangement wherein a bias winding 94a is positioned about primary electromagnet 12a and secondary electromagnet 20a so as to establish supplemental magnetic flux components in the strip in the direction of arrow 97, the rolling direction Y. This direction is the same as that of the portion of the flux flow path 98 generated by electromagnet 11a which passes through the strip.

It is to be understood that the vertical legs of the electromagnets in the devices described need not be connected together by horizontal legs specifically as set forth. It is only necessary that the vertical legs be joined to each other through a common path of low magnetic reluctance.

Other changes may be made in the present invention by those skilled in the art without departing from the spirit and scope thereof as defined in the following claims.

I claim:

1. In a method of measuring a stress in a given direction in a ferromagnetic material without contacting the material, the steps of establishing a plurality of sets of magnetic flux flow paths at spaced locations on the ferromagnetic material, each set of magnetic flux flow paths comprising first and second magnetic flux flow paths, passing a first portion of each of the first paths through the material in said given direction, passing a second portion of each of the first paths in a first direction through respective secondary electromagnets positioned adjacent the material, passing a first portion of each of the second paths through the material in a direction transverse to said given direction, passing a second portion of each of said second paths through said respective secondary electromagnets in a direction opposite to said first direction to produce a resultant flux in each of said respective secondary electromagnets, and measuring the magnitude of said resultant fluxes.

2. The method of claim 1 wherein the ferromagnetic material is a moving steel strip under tension and the plurality of sets of magnetic flux flow paths are established across the width of the strip.

3. In a method of measuring a stress in a given direction in a ferromagnetic material without contacting the material, the steps of establishing a set of magnetic flux flow paths comprising first and second pairs of magnetic flux flow paths, passing a first portion of one of the paths of said first pair of paths and a first portion of one of the paths of said second pair of paths through the material in said given direction, passing a second portion of said one of the paths in said first pair of paths in a first direction through a first secondary electromagnet positioned adjacent the material, passing a second portion of said one of the paths in said second pair of paths in a second direction opposite to said first direction through a second secondary electromagnet positioned adjacent the material, passing a first portion of the other of the paths of said first pair of paths and a first portion of the other of the paths of said second pair of paths through the material in a direction transverse to the given direction, passing a second portion of said other of the paths in said first pair of paths through said second electromagnet in the direction opposite to said second direction to produce a resultant flux therein and passing a second portion of said other of the paths in said second pair of paths through said first electromagnet in the direction opposite to said first direction to produce a resultant flux therein.

4. The method of claim 3 including establishing a plurality of sets of magnetic flux flow paths at spaced locations on the ferromagnetic material.

5. The method of claim 4 wherein the ferromagnetic material is a moving steel strip under tension and the plurality of sets of magnetic flux flow paths are established across the width of the strip.

6. The method of claim 3 including the additional step of establishing a supplemental magnetic flux flow path, passing at least a portion of the supplemental path through the material in said given direction so as to increase the flux in the material in that direction.

7. A device for measuring the stress in a ferromagnetic material in a given direction including means for producing a first magnetic flux flow path, a first portion thereof passing through said ferromagnetic material in said given direction, means for producing a second magnetic flux flow path, a first portion thereof passing through said ferromagnetic material transverse to said given direction, means common to a second portion of both said first and second magnetic flux flow paths for producing a resultant magnetic flux density therein equal to the difference between the magnetic flux densities of said second portions of said first and second magnetic flux flow paths, and means for establishing a supplemental magnetic flux flow in said ferromagnetic material in said given direction.

8. The device of claim 7 wherein said means for producing a first magnetic flux flow path and said means for producing a second magnetic flux flow path comprise first and second primary electromagnets, respectively, each electromagnet connected to an alternating current source, said means common to a second portion of both said first and second paths comprises a secondary electromagnet, said first and second primary electromagnets being joined to said secondary electromagnet at a common location by poles of opposite polarity, a plane entirely containing said first primary electromagnet and said secondary electromagnet intersecting a plane entirely containing said second primary electromagnet and said secondary electromagnet at a right angle along said secondary electromagnet.

9. A device for measuring the stress in a ferromagnetic material in a given direction comprising two primary electromagnets and two secondary electromagnets, each of the cores of the electromagnets having vertical legs so positioned in relation to one another that a vertical plane passing through the vertical legs of the primary electromagnet cores intersects at a right angle a vertical plane passing through the vertical legs of the secondary electromagnet cores, each of the vertical legs of the secondary electromagnet cores being equidistant from each of the vertical legs of the primary electromagnet cores and the distance between the vertical legs of the secondary electromagnet cores being equal to the distance between the vertical legs of the primary electromagnet cores and means operatively connected to said secondary electromagnets for summing the voltages induced therein upon the application of a magnetic flux thereto.

10. The device of claim 9 wherein the core of each electromagnet includes a horizontal leg, the horizontal legs being joined together at one of their ends and to a respective one of the vertical legs at their other ends.

11. A device for measuring the stress in a ferromagnetic material in a given direction including means for producing a first pair of magnetic flux flow paths, a first portion of one of the paths of said first pair of paths passing through said ferromagnetic material in said given direction and a first portion of the other of the paths of said first pair of paths passing through said ferromagnetic material transverse to said given direction, means for producing a second pair of magnetic flux flow paths, a first portion of one of the paths of said second pair of paths passing through said ferromagnetic material in the same direction as that of the first portion of said one of the paths of said first pair of paths and a first portion of the other of said second pair of paths passing through said ferromagnetic material in the same direction as that of the first portion of said other of the paths of said first pair of paths, means common to a second portion of said one of the paths of said first pair of paths and to a second portion of said other of the paths of said second pair of paths for producing a first resultant magnetic flux density therein equal to the difference between the magnetic flux densities of said portions, means common to a second portion of said other of the paths of said first pair of paths and to a second portion of said one of the paths of said second pair of paths for producing a second resultant magnetic flux density therein equal to the difference between the magnetic flux densities of said portions, and means for establishing a supplemental magnetic flux flow in said ferromagnetic material in said given direction.

12. The device of claim 11 wherein said means for producing said first pair of magnetic flux flow paths and said means for producing said second pair of magnetic flux flow paths comprise first and second primary electromagnets, respectively, each electromagnet connected to an alternating current source, said means common to a second portion of said one of the paths of said first pair of paths and to a second portion of said other of the paths of said second pair of paths and said means common to a second portion of said other of the paths of said first pair of paths and to a second portion of said one of the paths of said second pair of paths comprise first and second secondary electromagnets, respectively, said first and second primary electromagnets being joined to each other and to said first and second secondary electromagnets at a common location, a plane entirely containing said first and second primary electromagnets intersecting a plane entirely containing said first and second secondary electromagnets at a right angle.

13. In a method of measuring a stress in a given direction in a ferromagnetic material without contacting the material, the steps of establishing a set of magnetic flux flow paths comprising first and second magnetic flux flow paths, passing a first portion of the first path through the material in said given direction, passing a second portion of the first path in a first direction through a secondary electromagnet positioned adjacent the material, passing a first portion of the second path through the material in a direction transverse to said given direction, passing a second portion of said second path through said secondary electromagnet in a direction opposite to said first direction to produce a resultant flux in said secondary electromagnet, establishing a supplemental magnetic flux flow path, passing at least a portion of the supplemental path through the material in said given direction so as to increase the flux in the material in that direction, and measuring the magnitude of said resultant flux in said secondary electromagnet.

* * * * *